United States Patent [19]

Stevens

[11] Patent Number: 5,034,822
[45] Date of Patent: Jul. 23, 1991

[54] VIDEO CAMERA ADAPTOR FOR FILM CAMERAS

[76] Inventor: William M. Stevens, 6366 Paxton Woods Dr., Loveland, Ohio 45140

[21] Appl. No.: 406,693

[22] Filed: Sep. 13, 1989

[51] Int. Cl.$^5$ ............................................ H04N 5/225
[52] U.S. Cl. .................................... 358/229; 358/909
[58] Field of Search ............... 358/209, 224, 225, 229, 358/909, 228; 354/75, 76, 199, 219

[56] References Cited

U.S. PATENT DOCUMENTS 4,959,729  9/1990  Fukuda et al. ...................... 358/229

FOREIGN PATENT DOCUMENTS 63-117572  5/1988  Japan .
63-161778  7/1988  Japan .
63-173469  7/1988  Japan .
1-62974    3/1989  Japan .

*Primary Examiner*—James J. Groody
*Assistant Examiner*—Kim Yen Vu
*Attorney, Agent, or Firm*—Eugene F. Friedman

[57] ABSTRACT

An adaptor affixing a video camera to a film camera. The adaptor permits the transmission of the image formed on the focusing screen of the latter to reach the former in a correct left-right and up-down orientation. For this purpose, it utilizes a mirror which, in one position, transmits the image to the video camera. In the other, it permits the viewing of the image on the film camera's focusing screen with or without magnification. Nonetheless, it permits visual and manual access to the normal controls of the camera. A shield prevents the access of light not from the film camera's image to the video camera for a sharper and clearer image. The adaptor attaches to the usual coupling devices of the film camera which generally permits the affixing of photographic accessories. To permit a more compact system, the adaptor bends the light path from the image screen to the video camera through an angle greater than 90 degrees but not greater than 180 degrees. For a single lens reflex camera, this angle may amount to 130 degrees. For a view camera, the light path bends 180 degrees.

71 Claims, 7 Drawing Sheets

VIDEO CAMERA ADAPTOR FOR FILM CAMERAS

BACKGROUND

The combination of a video camera with a film camera portends several advantages. Initially, it allows the photographer, by looking at the video monitor, to arrange his scene without the necessity of regularly and frequently returning to the film camera itself. Simply looking at the monitor will tell him how the final picture will most likely appear.

Further, the video camera may have the ability to capture the actual pictures taken by a film camera. The photographer or the subject of the pictures may then view the magnetically recorded scenes on the video monitor to determine if they prove satisfactory. If not, the subjects may undergo further photographing without waiting for the development of the film itself and the necessity for returning to the photographer.

One system finding use attempts to accomplish this objective by placing a video camera with a beam splitter in front of the camera lens. As a consequence, it renders the video camera independent of the camera's optics. Thus, the photographer does not have the opportunity to view the film camera's focus since the picture he sees on the monitor does not pass through the camera's lens.

Further, the diversion of a portion of the beam reduces the amount of light available for the film camera. That has all of the usual photographic deleterious consequences.

Further, the film camera may likely employ different lenses. As a result, the system may not even provide on the video monitor the correct size picture that the film camera will see.

Further, this type of system makes impossible use of the front projection system, which places a picture behind the photographed subject. Accordingly, this type of system does not accomplish the desire for the effective video monitoring of what a film camera actually experiences.

Another concept employs a unified, integrated system employing a film camera with an integrated video camera. This system does permit the observing of the results produced by the camera's own lens.

However, as an integrated system, it eliminates the photographer's choice of actual equipment he may wish to use for the film camera. Furthermore, it deprives him of any opportunity to actually view the film camera's focusing screen to make sure that he has achieved the best picture possible. Additionally, it limits the utility of the film camera except for the specific purpose of utilization with the video camera.

Other systems utilizing large bulky adaptors have also found use. However, they have such a size as to limit their overall utility. Moreover, they often have the result of precluding the viewing and manipulation of the camera's controls.

Accordingly, the search continues for a system that will attach a video camera to a general film camera. It should allow the utilization of a video camera when desired with access to the film camera's controls.

SUMMARY

A video adaptor for a film camera which, by its lens, creates an image in a substantial plane first includes adaptor means for, when in a particular position relative to the plane of the image, transmitting that image to a video camera. The adaptor means itself includes optics means for transmitting the image along a path to a particular location relative to but removed from the camera's image plane. It further has a shielding device, coupled to the optics means, to exclude light not originating from the image itself from the location to where the image is transmitted.

Furthermore, the video adaptor includes a holding device which couples to the adaptor means. It affixes the adaptor means to the film camera in the particular position in which it can transmit the image. The holding device permits the manual releasing of the adaptor means from the film camera. Thus, they may disengage from each other so that the film camera may find its normal use.

Instead of including a shielding device, the video adaptor will find use where the film camera has controls as well as its lens. The holding device should then permit the visual and manual access to these controls of the film camera.

As a separate and independent aspect, the video adaptor may have a viewing device coupled to the adaptor means and possessing two configurations. In the first configuration, the viewing device directs the image from the image plane to the video camera. In the second of the two configurations, the viewing device directs the image to a location viewable by the photographer. The viewing device may undergo manual switching between these two configurations so that the photographer may choose whether to view the image on the camera's focusing screen or to send it to the video camera.

The method of using the adaptor involves transmitting an image formed in a substantial plane by the lens of a film camera. It begins with placing an adaptor means in a particular position relative to the image plane. The method next involves releasably affixing the adaptor to the film camera with the adaptor means in the particular position. An image is next transmitted from the image plane through optics means forming part of the adaptor means to the lens of a video camera. The method concludes with shielding light from the lens of the video camera.

As an alternative to shielding light from the lens of the video camera, the method may involve the utilization of a film camera having controls. In this instance, a further step in the process involves, with the adaptor means affixed to the film camera, viewing and manipulating the film camera's controls.

As a further aspect, the method may involve divertingthe image transmitted from the image plane of the camera to a location separate from the video camera. There it may be directly viewed by the human eye. Subsequently, the image returns to the video camera for its subsequent use there.

DETAILED DESCRIPTION

Figure 1:
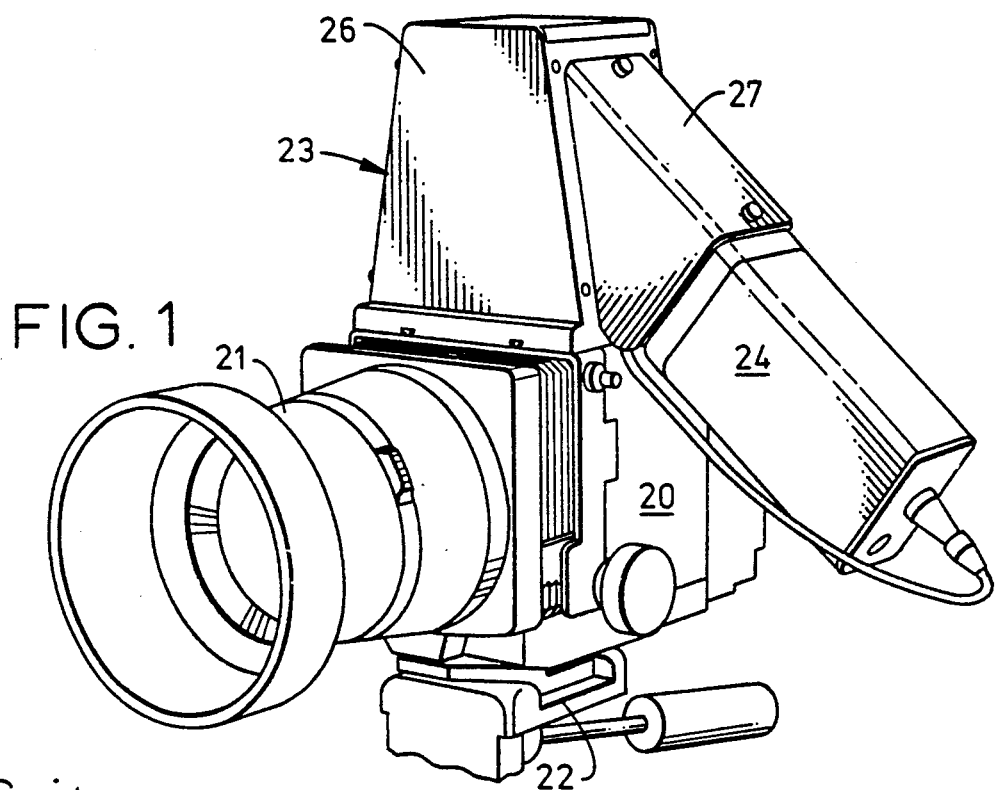
FIG. 1 is a perspective view of medium format camera with its lens and having attached to it an adaptor for transmitting the image form by the camera on its focusing screen to a video camera.

FIG. 1 shows a medium format camera generally at 20 with its lens 21 and sitting on the tripod 22. The video adaptor shown generally at 23 transmits the image formed on the focusing plane of the camera 20, as discussed below, to the video camera 24.

Figure 5:
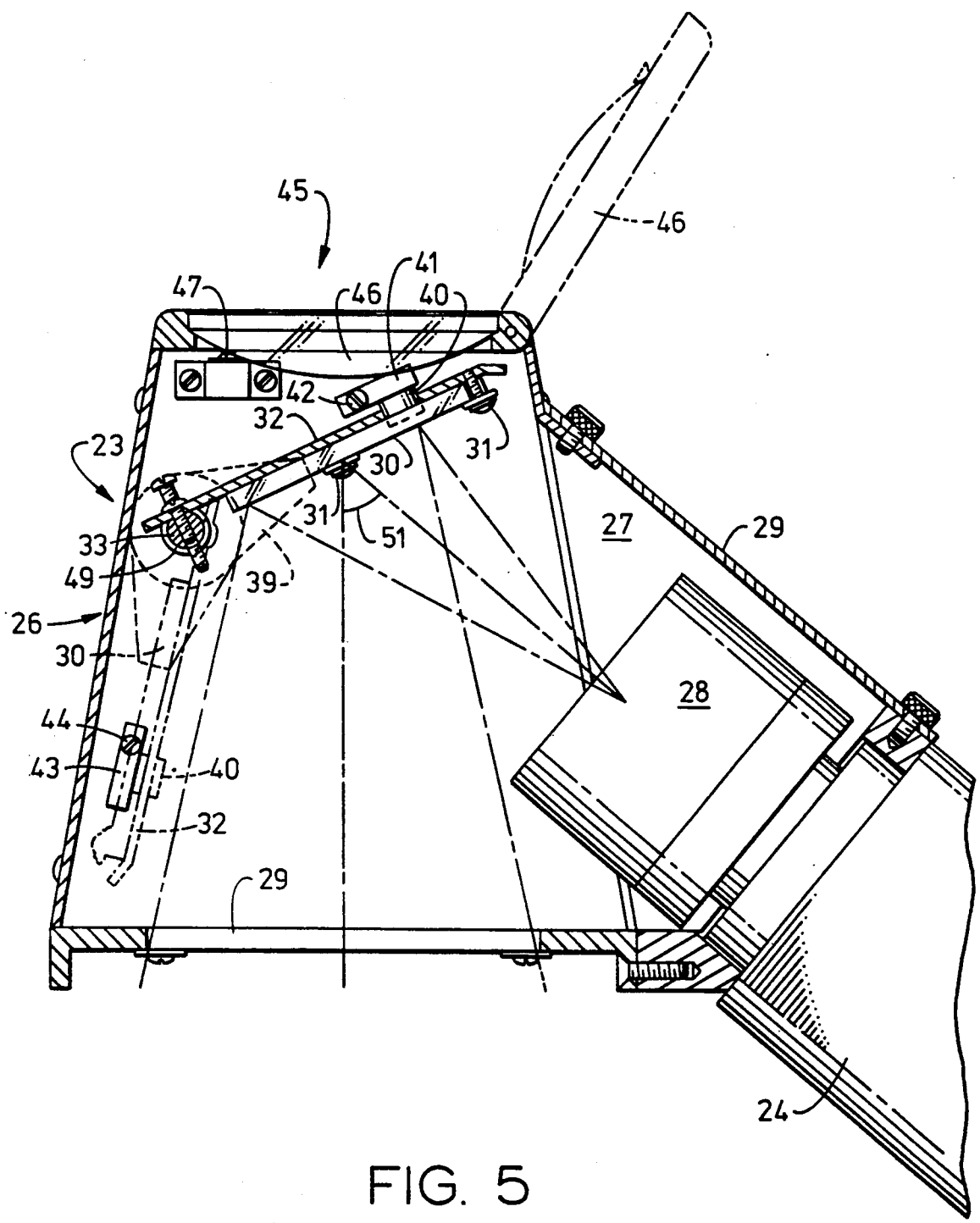
FIG. 5 provides a cross-sectional view along the line 5—5 of the video adaptor of FIG. 5.

The adaptor 23 includes the main section 26 and the side shaft 27. As seen in FIG. 5, the side shaft 27 basically holds the lens 28 of the video camera in place where it may receive the image from the film camera. The housing 29 of the side shaft 27 excludes exterior light from the video camera's lens 28.

Figure 4:
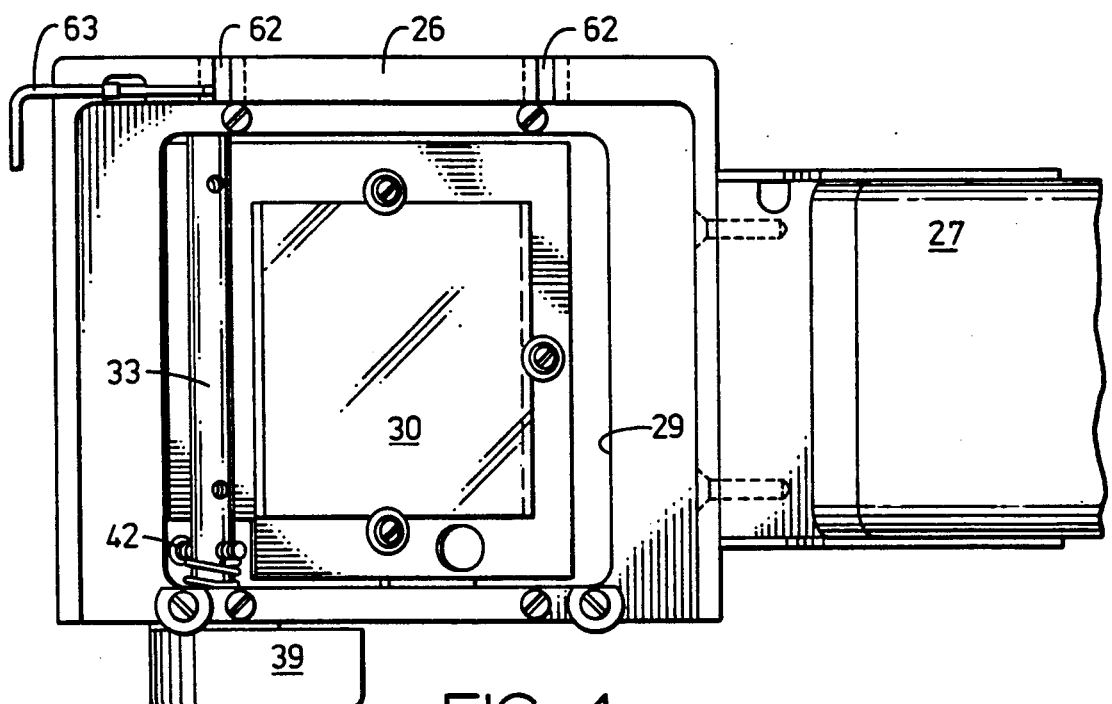
FIG. 4 gives a bottom plan view of the video adaptor of the prior figures.

As seen in FIGS. 4 and 5, the image from the film camera 20 passes through the opening 29 of the main housing 26. It then strikes the mirror 30 which transmits it directly into the video camera lens 28. The screws 31 hold the mirror 30 to the plate 32, which in turn attaches to the shaft 33.

Figure 11:
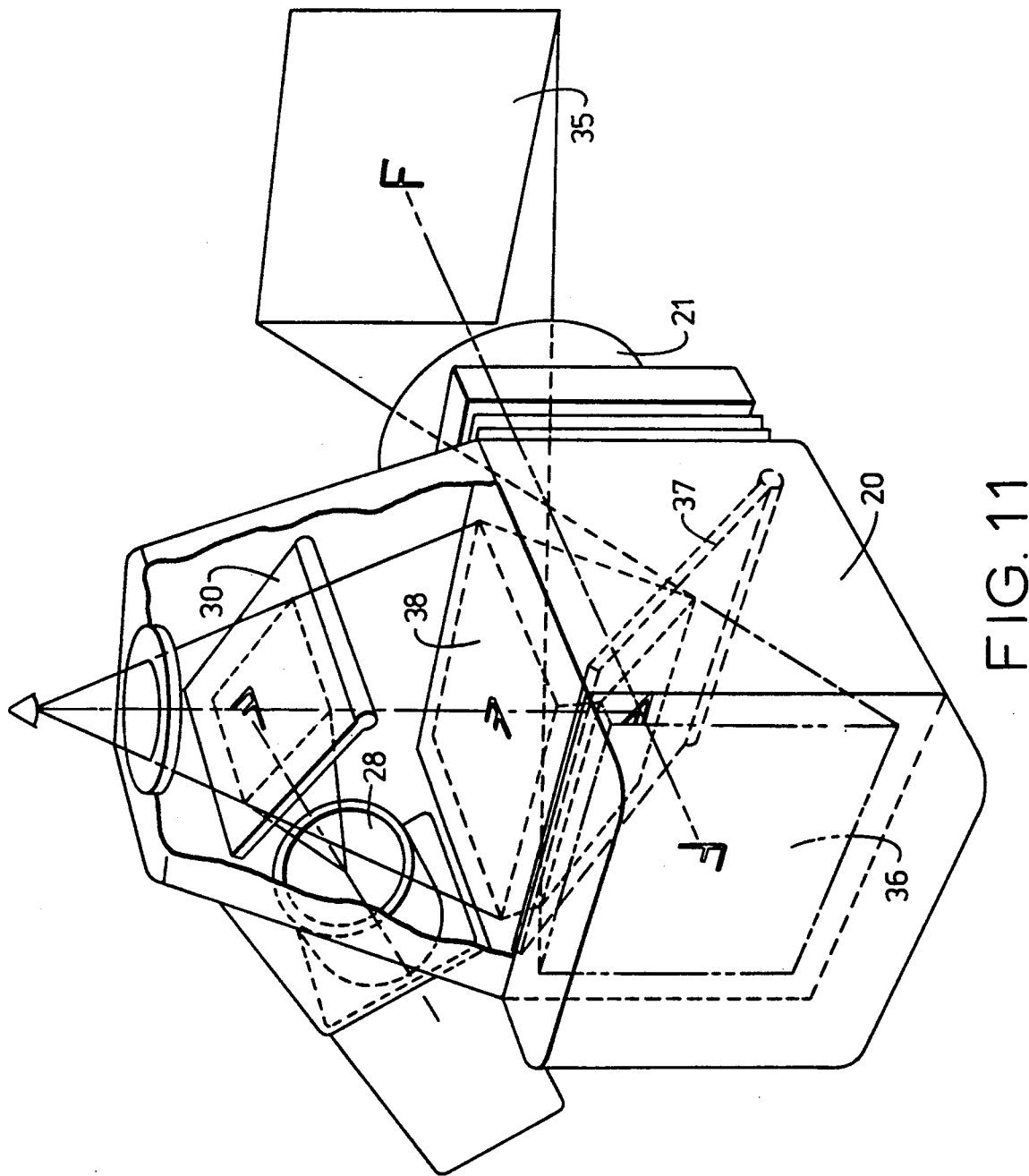
FIG. 11 provides an optical diagram of the camera and video adaptor of FIG. 1.

In FIG. 11, the original image 35 would strike the film plane 36 of the camera 20 with reversed left-right and up-down orientation. For the camera 20 to take an actual picture, its mirror 37 pivots downward to allow the image to pass through to the film plane 36.

When not taking a picture, the mirror 37 pivots to its upright position as shown in FIG. 11 to give an image on the camera's focusing screen 38 that has correct up-down orientation but a reversed left-right appearance. The image from the camera's focusing screen 38 then hits the adaptor's mirror 30 which serves to again reverse the left-right orientation so that image striking the video camera's lens 28 has both correct left-right and up-down orientation.

As discussed above and as seen in FIG. 5, in particular, the mirror 30 may occupy two positions. In its upper position, seen in solid lines in that figure, it casts the image from the focusing screen 38 of the camera 20 onto the video camera lens 28.

Figure 6:
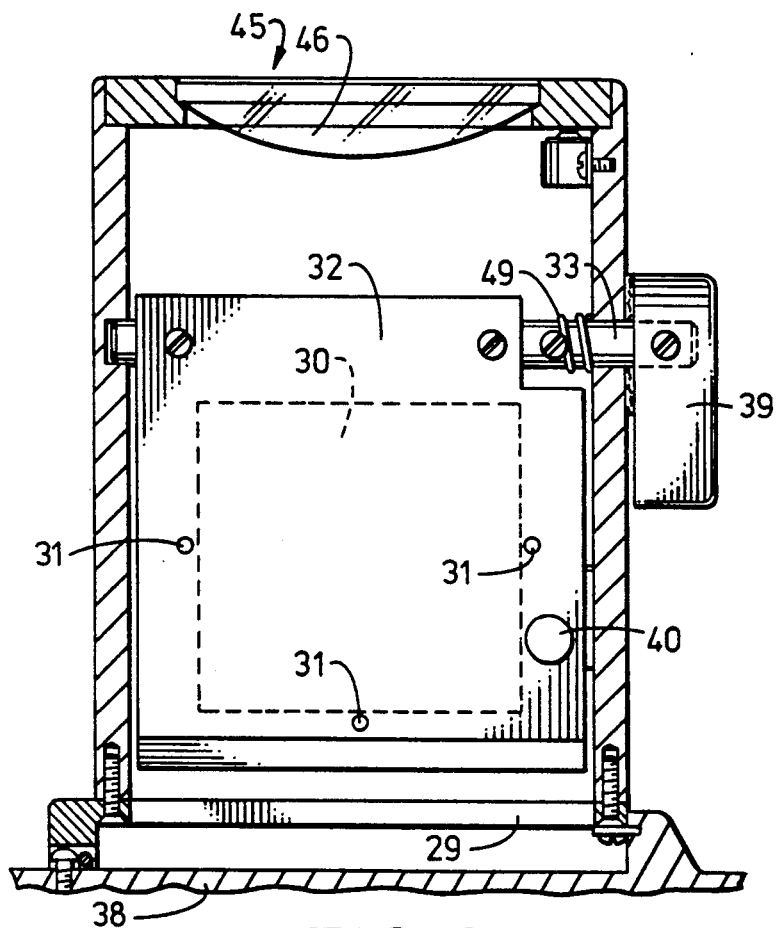
FIG. 6 gives an elevational cross-sectional view along the line 6—6 of the video adaptor in FIG. 2.

However, the knob 39 connects through the shaft 33 to the plate 32 and also the mirror 30. It can rotate the mirror 30 downward to its alternate position shown in phantom in FIG. 5. To keep the mirror 30 in the correct position, the magnet 40 passes through and attaches to the plate 32, and extends beyond either side of the plate 32 as seen in FIGS. 5 and 6. The magnet 40 keeps the mirror in its upper position by adhering to the small steel block 41 held to the side of the main adaptor unit 26 by the screw 42.

In its lower configuration, the magnet 40 sticks to the lower steel block 43 held to the side of the main adaptor unit 26 by the screw 44. The operator changes the position of the mirror 30 by rotating the knob 39 with sufficient force to overcome the attraction between the magnet 40 and the upper or lower steel block 41 or 43 as appropriate.

The position of the knob 39, when it moves the mirror down to its lower position also appears in phantom in FIG. 5. In this configuration, the mirror 30 can no longer deflect the image passing through the opening 29 onto the video camera's lens 28. Instead, it passes to the opening 45 where the photographer may visually and directly view it. The magnifier 46 permits a detailed examination of the image as it appears on the focusing screen 38 of the camera 20. The steel screw 47 attracts a magnet on the side of the magnifier 46 to keep it properly positioned when placed in the viewing path.

Alternately, the photographer may wish to view the image on the focusing screen 38 without the aid of the magnifier 46. In this instance, he simply rotates it out of place, as shown in phantom in FIG. 5. With the mirror 30 in its downward position as shown in phantom he may then merely look through the opening 45 to see the image produced by the film camera lens 21 on its focusing screen.

As seen in FIGS. 5 and 6, the coil spring 49 under compression surrounds the shaft 33 which in turns connects to the knob 39. It biases the shaft 33, the plate 32, and the mirror in the direction away from the side of the main adaptor section 26 through which the shaft 33 attaches to the knob 39.

Also as seen in particular, in FIGS. 1, 2, 5, and 11, the adaptor 23, particularly its mirror 30, bends the path of the image through the angle 51 (as seen in FIG. 5) of 130 degrees. In the single lens reflex camera 20, this provides for a compact overall structure. In this fashion, the adaptor 23 with the video camera 24 provides minimal encumbrance to the use of the camera 20. The use of the adaptor 23 still permits the viewing of and access to all of the usual controls of the camera 20.

To achieve a compact structure, the adaptor should generally bend the path of the light travelling from the film camera's focusing screen to the video camera through an angle greater than 90 degrees and less than or equal to 180 degrees. As discussed below with regards to FIG. 12, the view camera shown there bends the light path through two 90 degree angles for a total of 180 degrees of deflection.

As seen in FIGS. 7 to 10, the film camera 20 includes the recessed slot 55 on one side of its focusing screen and the upstanding screw 56 on the other side. These permit the attachment of accessories in the vicinity of the focusing screen 38 itself. The adaptor 23 takes advantage of these components to attach itself to the camera 20.

Figure 7:
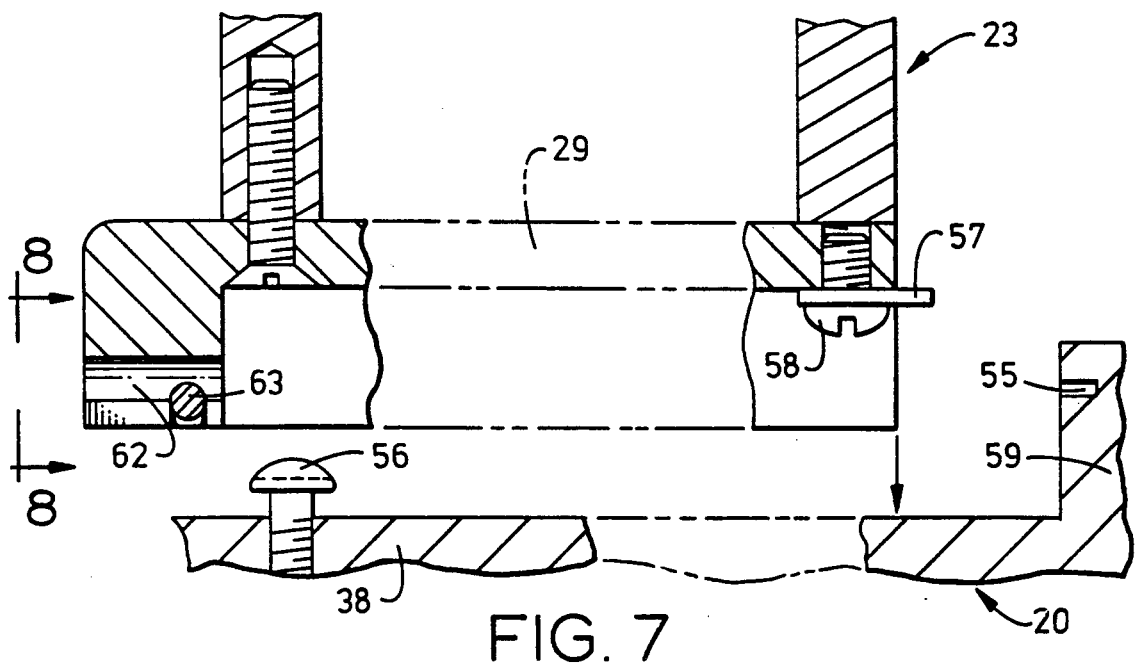
FIG. 7 provides an enlarged view of the portion of the video adaptor in FIG. 6 at the beginning of the attachment of the adaptor to the film camera.

As shown in FIG. 7, the attachment of the adaptor 23 commences by the photographer placing the adaptor 23 above and, as seen in that FIGURE, to the left of the focusing screen 38 of the camera 20. This allows the downward movement of the adaptor 23 toward the camera to result in the arrangement seen in FIG. 9. In particular, the lateral displacement of the adaptor 23 from the focusing screen 38 allows the downward movement of the former without the washer 57 held in place by the screw 58 making contact with the ridge 59 in which appears the slotted recessed 55. Similarly, the lateral displacement of the adaptor 23 allows its downward motion without interference from the screw 56.

Figure 9:
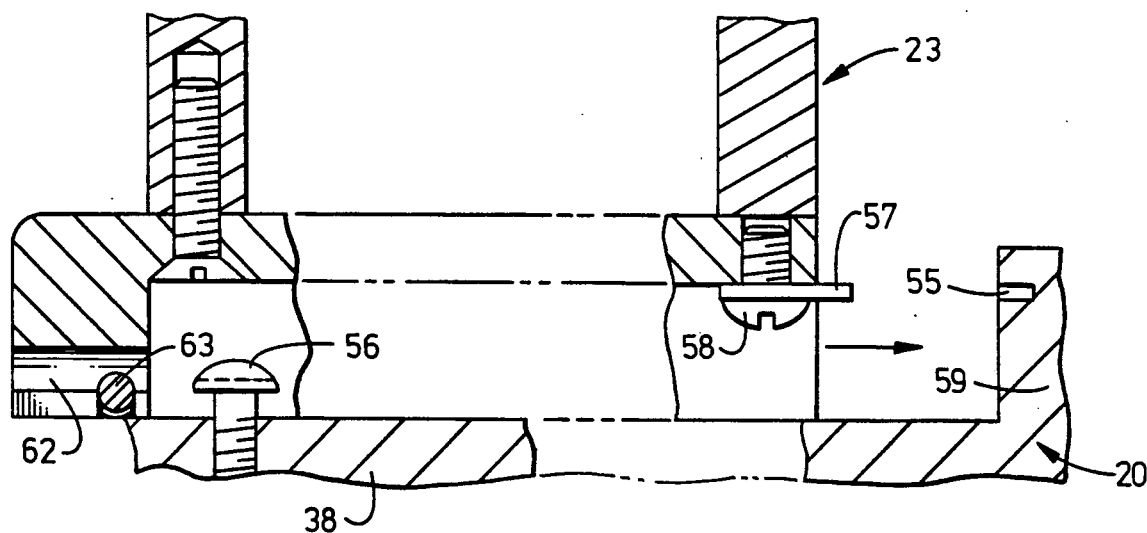
FIG. 9 shows an intermediate stage in the attachment of the adaptor to the film camera.

Moving the adaptor 23 to the right in FIG. 9 relative to the camera 20 allows for the attachment of the former to the latter. This occurs because the washer 57 fits into the recessed slot 55 in the ridge 59 of the camera 20.

Figure 2:
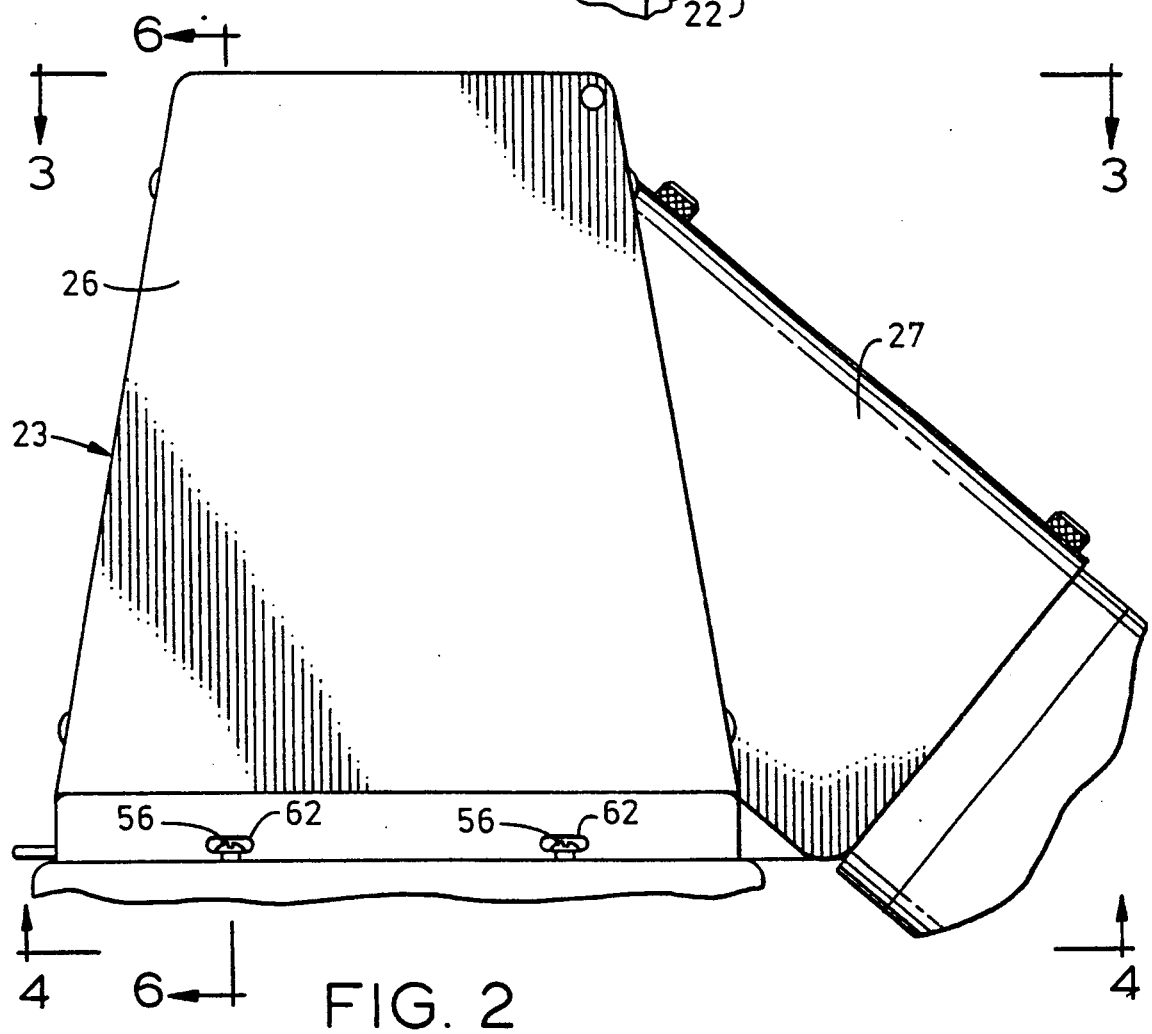
FIG. 2 gives a front elevational view of the video adaptor seen in FIG. 1.
Figure 8:
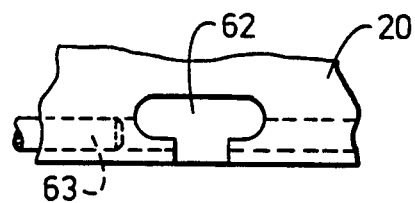
FIG. 8 provides a side elevational view of the mushroom shaped opening and the rod, seen along the line 8—8, of the adaptor of FIG. 7, and finding use in attaching the adaptor to the film camera.
Figure 10:
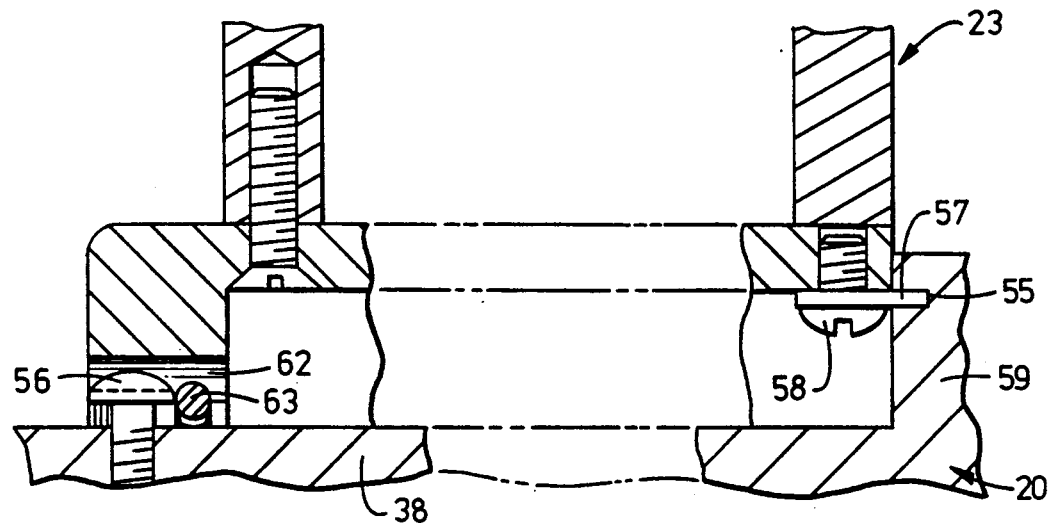
FIG. 10 shows the completion of the attachment of the adaptor to the film camera.

At the same time, the left side of the adaptor 23 includes the mushroom-shaped opening 62 (seen from the side in FIG. 8). As the adaptor 23 moves to the right in FIG. 9, the screw 56 fits into the mushroom-shaped opening 62. At the furthest right movement of the adaptor 23, the screw 56 sits totally embedded in the opening 62 as seen in FIGS. 10 and 2. At this stage, the adaptor 23 cannot move to the right because it abuts the ridge 59 of the camera 20. Furthermore, it cannot move upward since the washer 57 fits in the recessed slotted 55 and the screw 56 fits in the opening 62.

Figure 3:
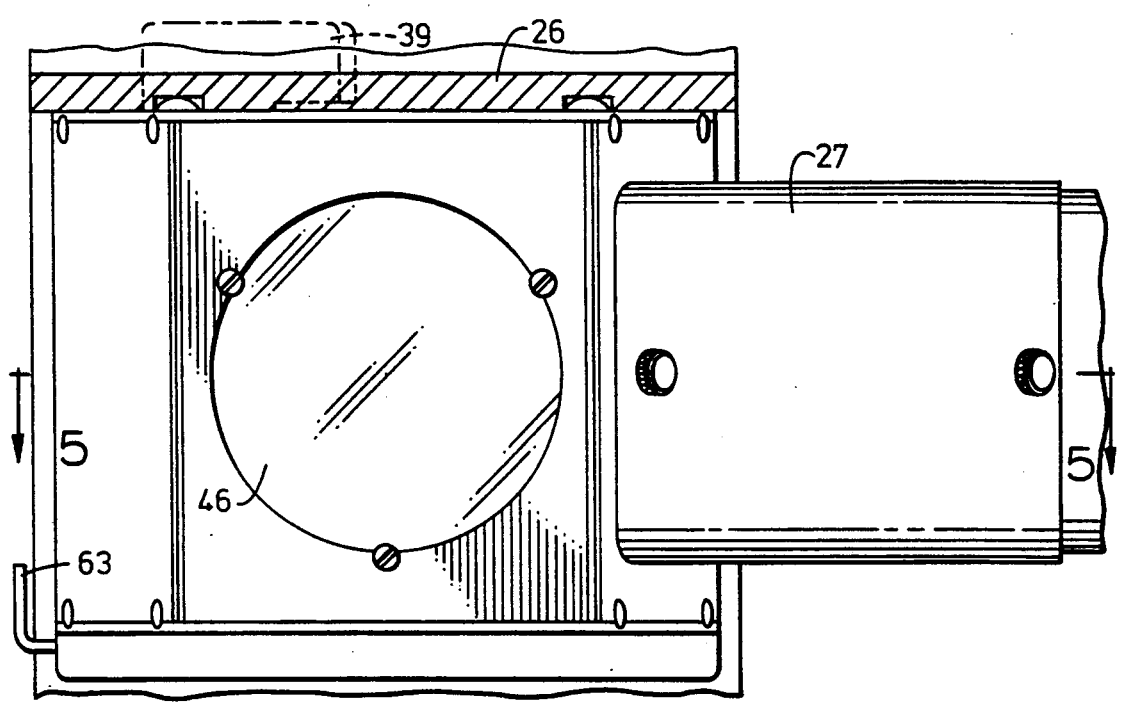
FIG. 3 gives a top plan view of the video adaptor of the prior figures.

As a consequence, the only motion permitted of the adaptor 23, at this point, would be a lateral displacement to the left, reversing the motion which brought the two components together in FIG. 10. To prevent that motion, the angle rod 63 moves forward in FIGS. 7, 9, and 10 (and the right in FIG. 8). This causes the angle rod 63 to move through the opening 62 in a direction perpendicular to the length of the screw 56. With the rod 62 in place, the screw 56 abuts against it to prevent motion of the adaptor 23 to the left in FIG. 10. The entire angle rod 63 appears in FIG. 4 with a portion also seen in FIG. 3 to show that it extends beyond the edge of the adaptor 23. Thus, the photographer may easily insert and remove it to allow for the attachment and removal of the adaptor 23 from the camera 20.

Figure 12:
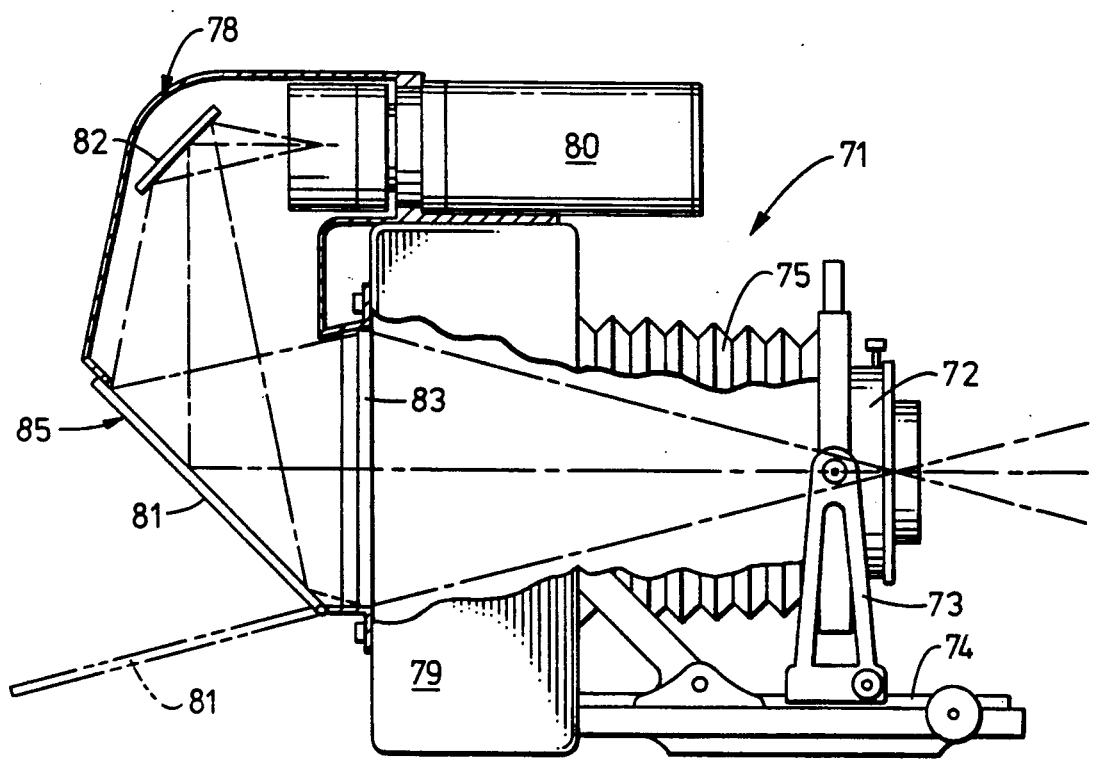
FIG. 12 provides a side elevational view, partially in cross-section and partially diagrammatic, of a view camera having a video adaptor and video camera attached to it.

The view camera indicated generally at 71 in FIG. 12 includes the lens 72 which sits in the bracket 73 moving along the track 74. The bellows 75, in the typical fashion, allows the movement of the lens 72 to the left and right in FIG. 12 for focusing. The video adaptor indicated generally at 78 attaches to the rear 79 of the camera 71. It may do so using the usual accessory coupling devices generally found on the view camera. The adaptor serves to attach the video camera 80 to the view camera 71.

The two mirrors 81 and 82 take the image formed on the focusing screen 83 of the view camera 71 and deflects it through two 90 degree angles to provide it to the video camera 80. Thus, the total deflection of the path of the image from the focusing screen 83 to the video camera 80 amounts to 180 degrees.

As seen in FIG. 12, the photographer may rotate the lower mirror 81 in the counter-clockwise direction until it reaches the position shown in phantom in FIG. 12. This permits the photographer to directly view the image on the focusing screen 83 of the view camera 71 through the resulting opening 85 in the adaptor 78.

Accordingly, what is claimed is:

1. A video adaptor for a film camera, said camera having a lens and, by its lens, creating an image in a substantial plane, said adaptor comprising:
   (A) adaptor means for, when in a particular position relative to said plane, transmitting said image to a video camera, said adaptor means including:
      (1) optics means for transmitting said image along a path to a particular location relative to but removed from said plane; and
      (2) shielding means, coupled to said optics means, for excluding light that is not from said image from said particular location; and
   (B) holding means, coupled to said adaptor means, for manually releasably affixing said adaptor means to said film camera with said adaptor means in said particular position.

2. The adaptor of claim 1 runs said film camera includes a focusing screen and said image appears on said focusing screen.

3. The adaptor of claim 2 further including viewing means, coupled to said adaptor means and having two configurations for, when in the first of said two configurations, directing said image in said plane to said video camera and, when in the second of said two configurations, directing said image to a location viewable by a human eye, said viewing means being manually switchable between said first and second configurations.

4. The adaptor of claim 3 wherein said optics means further transmits that image with correct left-right and up-down orientation to said particular location.

5. The adaptor of claim 4 wherein said optics means, in transmitting said image along said path, bends said path as it travels from said focusing screen to said particular location through an angle greater than 90 degrees but less than or equal to 180 degrees.

6. The adaptor of claim 4 wherein said viewing means includes a mirror having first and second orientations relative to said path, said viewing means, when said mirror is in said first orientation, being in said first configuration and, when said mirror is in said second orientation, being in said second configuration.

7. The adaptor of claim 6 further including magnifying means for, when said viewing means is in said second configuration, increasing the size of the image provided by said focusing screen as viewed by human eye.

8. The adaptor of claim 7 including switching means, coupled to said magnifying means, for removing said magnifying means out of the path between said focusing screen and said location where said image is viewable by a human eye.

9. The adaptor of claim 4 wherein said shielding means excludes substantially all light not from said focusing screen from said video camera.

10. The adaptor of claim 4 wherein said film camera has controls and said holding means, when affixing said adaptor means to said film camera, leaves said controls visually and manually accessible.

11. The adaptor of claim 4 wherein said film camera is a single lens reflex camera.

12. The adaptor of claim 11 wherein said optics means deflects said path of said image, when traveling from said focusing screen to said video camera, through an angle of about 130 degrees.

13. The adaptor of claim 12 wherein said film camera includes accessory coupling means for attaching accessories to said film camera in the vicinity of said focusing screen and said holding means attaches to said accessory coupling means to affix said adaptor means to said film camera.

14. The adaptor of claim 4 wherein said film camera is a view camera.

15. The adaptor of claim 4 wherein said optics means deflects said path of said image, when traveling from said focusing screen to said video camera, through an angle of about 180 degrees.

16. The adaptor of claim 15 wherein said film camera includes accessory coupling means for attaching accessories to said film camera in the civinity of said focusing screen and said holding means attaches to said accessory coupling means to affix said adaptor means to said film camera.

17. A video adaptor for a film camera, said camera having controls and a lens and, by its lens, creating an image in a substantial plane, said adaptor comprising:
(A) adaptor means for, when in a particular position relative to said plane, transmitting said image to a video camera, said adaptor means including optics means for transmitting said image along a path to a particular location relative to but removed from said plane; and
(B) holding means, coupled to said adaptor means, for manually releasably affixing said adaptor means to said film camera with said adaptor means in said particular position, with said controls remaining visually and manually accessible.

18. The adaptor of claim 17 runs said film camera includes a focusing screen and said image appears on said focusing screen.

19. The adaptor of claim 18 further including viewing means, coupled to said adaptor means and having two configurations for, when in the first of said two configurations, directing said image in said plane to said video camera and, when in the second of said two configurations, directing said image to a location viewable by a human eye, said viewing means being manually switchable between said first and second configurations.

20. The adaptor of claim 19 wherein said optics means further transmits that image with correct left-right and up-down orientation to said particular location.

21. The adaptor of claim 20 wherein said optics means, in transmitting said image along said path, bends said path as it travels from said focusing screen to said particular location through an angle greater than 90 degrees but less than or equal to 180 degrees.

22. The adaptor of claim 20 wherein said viewing means includes a mirror having first and second orientations relative to said path, said viewing means, when said mirror is in said first orientation, being in said first configuration and, when said mirror is in said second orientation, being in said second configuration.

23. The adaptor of claim 22 further including magnifying means for, when said viewing means is in said second configuration, increasing the size of the image provided by said focusing screen as viewed by human eye.

24. The adaptor of claim 23 including switching means, coupled to said magnifying means, for removing said magnifying means out of the path between said focusing screen and said location where said image is viewable by a human eye.

25. The adaptor of claim 20 wherein said film camera is a single lens reflex camera.

26. The adaptor of claim 25 wherein said optics means deflects said path of said image, when traveling from said focusing screen to said video camera, through an angle of about 130 degrees.

27. The adaptor of claim 26 wherein said film camera includes accessory coupling means for attaching accessories to said film camera in the vicinity of said focusing screen and said holding means attaches to said accessory coupling means to affix said adaptor means to said film camera.

28. The adaptor of claim 20 wherein said film camera is a view camera.

29. The adaptor of claim 28 wherein said optics means deflects said path of said image, when traveling from said focusing screen to said video camera, through an angle of about 180 degrees.

30. The adaptor of claim 29 wherein said film camera includes accessory coupling means for attaching accessories to said film camera in the vicinity of said focusing screen and said holding means attaches to said accessory coupling means to affix said adaptor means to said film camera.

31. A video adaptor for a film camera, said camera having a lens and, by its lens, creating a real image in a substantial plane, said adaptor comprising:
(A) adaptor means for, when in a particular position relative to said plane, transmitting said image to a video camera, said adaptor means including optics means for transmitting said image along a path to a particular location relative to but removed from said plane;
(B) holding means, coupled to said adaptor means, for manually releasably affixing said adaptor means to said film camera with said adaptor means in said particular position; and
(C) viewing means, coupled to said adaptor means and having two configurations, for, when in the first of said two configurations, directing said image in said plane to said video camera and, when in the second of said two configurations, directing said image to a location viewable by a human eye, said viewing means being manually switchable between said first and second configurations.

32. The adaptor of claim 31 runs said film camera includes a focusing screen and said image appears on said focusing screen.

33. The adaptor of claim 32 wherein said optics means further transmits that image with correct left-right and up-down orientation to said particular location.

34. The adaptor of claim 33 wherein said optics means, in transmitting said image along said path, bends said path as it travels from said focusing screen to said particular location through an angle greater than 90 degrees but less than or equal to 180 degrees.

35. The adaptor of claim 33 wherein said optics means further transmits that image with correct left-right and up-down orientation to said particular location.

36. The adaptor of claim 35 further including magnifying means for, when said viewing means is in said second configuration, increasing the size of the image provided by said focusing screen as viewed by human eye.

37. The adaptor of claim 36 including switching means, coupled to said magnifying means, for removing said magnifying means out of the path between said focusing screen and said location where said image is viewable by a human eye.

38. The adaptor of claim 33 wherein said film camera is a single lens reflex camera.

39. The adaptor of claim 38 wherein said optics means deflects said path of said image, when traveling from said focusing screen to said video camera, through an angle of about 130 degrees.

40. The adaptor of claim 39 wherein said film camera includes accessory coupling means for attaching accessories to said film camera in the vicinity of said focusing screen and said holding means attaches to said accessory coupling means to affix said adaptor means to said film camera.

41. The adaptor of claim 33 wherein said film camera is a view camera

42. The adaptor of claim 41 wherein said optics means deflects said path of said image, when traveling from said focusing screen to said video camera, through an angle of about 180 degrees.

43. The adaptor of claim 42 wherein said film camera includes accessory coupling means for attaching accessories to said film camera in the vicinity of said focusing screen and said holding means attaches to said accessory coupling means to affix said adaptor means to said film camera.

44. A method of transmitting an image formed in a substantial plane by the lens of a film camera comprising:
  (A) placing an adaptor means in a particular position relative to said plane;
  (B) releasably affixing said adaptor means to said film camera with said adaptor means in said particular position;
  (C) transmitting said image from said plane through optics means forming a part of said adaptor means to the lens of a video camera; and
  (D) shielding light that is not from said image from said lens of said video camera.

45. The method of claim 44 wherein said image formed in said plane is formed on a focusing screen and further including the step of viewing said image on said focusing screen.

46. The method of claim 45 wherein said image is transmitted through said optics means to said lens of said video camera with correct left-right and up-down orientation.

47. The method of claim 46 wherein the path of said image, when transmitted from said plane through said optics means to said lens of said video camera, is deflected through an angle greater than 90 degrees and less than or equal to 180 degrees.

48. The method of claim 45 including selectively magnifying said image on said focusing screen prior to viewing it.

49. The method of claim 44 including shielding substantially all light not from said image in said plane from said lens of said video camera.

50. The method of claim 45 wherein said film camera includes controls and further including the steps of viewing and manipulating said controls.

51. The method of claim 45 wherein the path of said image, when transmitted from said plane through said optics means to said lens of said video camera, is deflected through an angle of about 130 degrees.

52. The method of claim 51 wherein said film camera includes coupling means for holding accessories to said film camera in the vicinity of said focusing screen and the affixing of said adaptor means to said film camera is accomplished by attaching said adaptor means to said coupling means.

53. The method of claim 45 wherein the path of said image, when transmitted from said plane through said optics means to said lens of said video camera, is deflected through an angle of about 180 degrees.

54. The method of claim 53 wherein said film camera includes coupling means for holding accessories to said film camera in the vicinity of said focusing screen and the affixing of said adaptor means to said film camera is accomplished by attaching said adaptor means to said coupling means.

55. A method of transmitting an image formed in a substantial plane by the lens of a film camera having controls comprising:
  (A) placing an adaptor means in a particular position relative to said plane;
  (B) releasably affixing said adaptor means to said film camera with said adaptor means in said particular position;
  (C) transmitting said image from said plane through optics means forming part of said adaptor means to the lens of a video camera; and
  (D) with said adaptor means affixed to said film camera, viewing and manipulating said controls.

56. The method of claim 55 wherein said image formed in said plane is formed on a focusing screen and further including the step of viewing said image on said focusing screen.

57. The method of claim 56 wherein said image is transmitted through said optics means to said lens of said video camera with correct left-right and up-down orientation.

58. The method of claim 57 wherein the path of said image, when transmitted from said plane through said optics means to said lens of said video camera, is deflected through an angle greater than 90 degrees and less than or equal to 180 degrees.

59. The method of claim 56 including selectively magnifying said image on said focusing screen prior to viewing it.

60. The method of claim 56 wherein the path of said image, when transmitted from said plane through said optics means to said lens of said video camera is deflected through an angle of about 130 degrees.

61. The method of claim 60 wherein said film camera includes coupling means for holding accessories to said film camera in the vicinity of said focusing screen and the affixing of said adaptor means to said film camera is accomplished by attaching said adaptor means to said coupling means.

62. The method of claim 60 wherein the path of said image, when transmitted from said plane through said optics means to said lens of said video camera, is deflected through an angle of about 180 degrees.

63. The method of claim 62 wherein said film camera includes coupling means for holding accessories to said camera and the affixing of said adaptor means to said film camera is accomplished by attaching said adaptor means to said coupling means.

64. A method of transmitting an image formed in a substantial plane by the lens of a film camera having controls comprising:
  (A) placing an adaptor means in a particular position relative to said plane;
  (B) releasably affixing said adaptor means to said film camera with said adaptor means in said particular position;
  (C) transmitting said image from said plane through optics means forming part of said adaptor means to the lens of a video camera;
  (D) selectively diverting said image from said video camera to a separate location directly viewable by a human eye; and
  (E) selectively returning said image to said video camera.

65. The method of claim 64 wherein said image is transmitted through said optics means to said lens of said video camera with correct left-right and up-down orientation.

66. The method of claim 65 wherein the path of said image, when transmitted from said plane through said optics means to said lens of said video camera, is deflected through an angle greater than 90 degrees and less than or equal to 180 degrees.

67. The method of claim 64 including selectively magnifying said image on said focusing screen prior to viewing it.

68. The method of claim 64 wherein the path of said image, when transmitted from said plane through said optics means to said lens of said video camera is deflected through an angle of about 130 degrees.

69. The method of claim 68 wherein said film camera includes coupling means for holding accessories to said film camera in the vicinity of said focusing screen and the affixing of said adaptor means to said film camera is accomplished by attaching said adaptor means to said coupling means.

70. The method of claim 64 wherein the path of said image, when transmitted from said plane through said optics means to said lens of said video camera is deflected through an angle of about 180 degrees.

71. The method of claim 70 wherein said film camera includes coupling means for holding accessories to said film camera in the vicinity of said focusing screen and the affixing of said adaptor means to said film camera is accomplished by attaching said adaptor means to said coupling means.

* * * * *